United States Patent [19]

Wu et al.

[11] Patent Number: 5,532,040

[45] Date of Patent: Jul. 2, 1996

[54] MULTIMATERIAL FULLY ISOTROPIC LAMINATES AND MULTIMATERIAL QUASI-HOMOGENEOUS ANISOTROPIC LAMINATES

[76] Inventors: Kuang-Ming Wu; Thomas J. Wu, both of 1321 Timberly La., McLean, Va. 22102

[21] Appl. No.: 228,256

[22] Filed: Apr. 15, 1994

[51] Int. Cl.⁶ ........................................ D06N 7/04
[52] U.S. Cl. ...................... 428/141; 428/174; 428/411.1; 428/910
[58] Field of Search .................. 428/141, 174, 428/411.1, 910

[56] References Cited

U.S. PATENT DOCUMENTS

| 3,768,760 | 10/1973 | Jensen | 428/174 X |
| 4,621,980 | 11/1986 | Reaverly et al. | 416/226 |
| 4,848,745 | 7/1989 | Bohannan et al. | 273/72 R |
| 4,882,230 | 11/1989 | Warner | 428/516 |
| 4,946,721 | 8/1990 | Kindervater et al. | 428/36.1 |
| 5,126,190 | 6/1992 | Sakatani et al. | 428/225 |

Primary Examiner—D. S. Nakarani
Assistant Examiner—H. Thi Le

[57] ABSTRACT

The present invention discovers the layup of
  i. a multimaterial fully isotropic laminate that exhibits a concomitant stiffness isotropy in extension, shear, bending, and twisting; and
  ii. a multimaterial quasi-homogeneous anisotropic laminate that has identical stiffness anisotropy in extension and bending as well as in shear and twisting.

In addition, layups of the multimaterial fully isotropic laminate lead to a substantially new category of the single-material fully isotropic laminate.

Although these laminate layups have distinctive applications as load-carrying structures, the approaches and models that generate these layups are closely related.

10 Claims, 4 Drawing Sheets

MULTIMATERIAL FULLY ISOTROPIC LAMINATES AND MULTIMATERIAL QUASI-HOMOGENEOUS ANISOTROPIC LAMINATES

BACKGROUND OF THE INVENTION

The present invention relates to the layup of i. a multimaterial fully isotropic laminate that exhibits a concomitant stiffness isotropy in extension, shear, bending, and twisting; and ii a multimaterial quasi-homogeneous anisotropic laminate that has identical stiffness anisotropy in extension and bending as well as in shear and twisting for the composite laminates requiring at least two different materials. In addition, layups of the multimaterial fully isotropic laminate relate to a substantially new category of the single-material fully isotropic laminate. The present invention improves over the prior art in the U.S. patent application Ser. No. 07/817,385 filed on Jan. 6, 1992, later U.S. Pat. No. 5,312,670 dated 17 May 1994, and offers further structural weight reduction and material cost saving.

Figure 1:
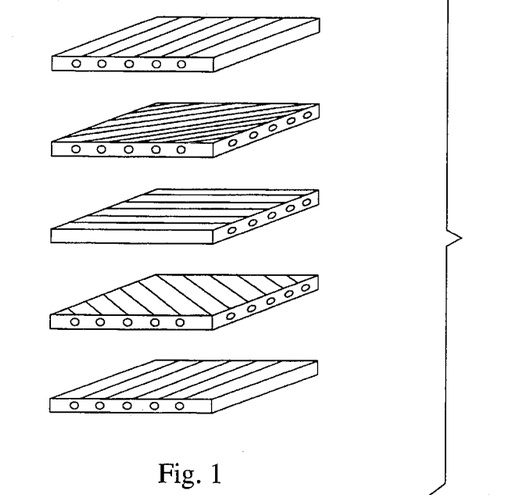
FIG. 1 shows an exploded view of a flat laminate.

A laminate is a flat plate or curved shell consisting of two or more plies stacked and bonded as an integral component for structural applications. Each ply is a uniform-thickness layer of material. FIG. 1 shows an exploded view of a typical flat laminate. The arrangement of the material, thickness, orientation, and stacking sequence of the plies is referred to as the "layup" of the laminate. The layup of a laminate is generally tailored to match the stiffness and strength requirements for loadings from various directions.

Figure 2A:
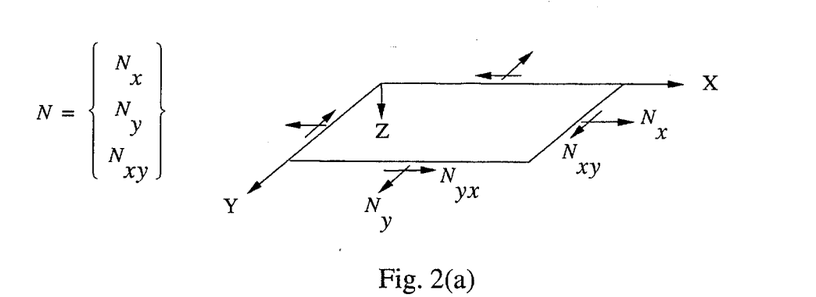
FIGS. 2(a) and 2(b) illustrate the definitions of the coordinate system and the mechanical loadings on a flat laminate respectively.
Figure 2B:
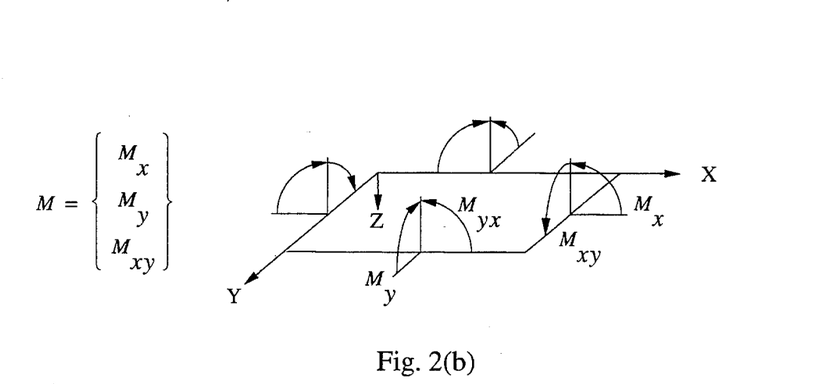

FIGS. 2(a) and 2(b) illustrate the definitions of the coordinate system and the mechanical loadings (extension, shear, bending, and twisting) on a flat laminate.

In this application,

"Sublaminate" refers to a part of a laminate, which consists of a group of plies (adjacent or detached) related to one another by the ply material, orientation, thickness, and so forth;

"Midplane" refers to the plane containing all the midpoints in the thickness direction of the laminate;

"Orientation angle" refers to the angle between the material axis (usually the fiber direction) of a ply and a reference axis fixed in the midplane of the laminate;

"Extensional stiffness" relates the extensional force intensity on a laminate to the extensional strain on the laminate midplane;

"Shear stiffness" relates the shear force intensity on a laminate to the shear strain on the laminate midplane;

"Bending stiffness" relates the bending moment intensity on a laminate to the bending curvature on the laminate midplane;

"Twisting stiffness" relates the twisting moment intensity on a laminate to the twisting curvature on the laminate midplane;

"Weighting factor" is a conventional mathematical term and will be clarified in the Detailed Description;

"Isotropy" refers to material properties that are the same in every direction (with infinite numbers of planes of symmetry);

"Orthotropy" refers to material properties that vary with direction and have mutually perpendicular planes of material symmetry;

"Anisotropy" refers to material properties that vary with direction and have no plane of material symmetry;

"Nonisotropy" refers to orthotropy or anisotropy. (Applicants: In the field of composite technology, "anisotropy" and "directionality" are often used synonymously for nonisotropy. This convention is adopted in the present application.)

For clarification and examples: each layer of a laminated safety glass is an isotropic material; most of the metallic alloys are considered isotropic materials; cloth is an orthotropic material; composite materials such as boron/epoxy and graphite are inherently anistropic or orthotropic materials. (Attachment 1)

The constituent material of a uniform-thickness ply may be homogeneous or heterogeneous (including porous material); isotropic or nonisotropic; honeycomb-like or otherwise mechanically formed; or of certain combination of the above. In the present application, however, the terms "material" and "material property" refer to the effective ply material and property that is computed by assuming the ply is homogeneous.

Therefore, the term "multimaterial" used for the present invention refers to the variation of the effective ply material property between plies, rather than the variation of the constituent material property within a ply.

To date, laminated plates and shells have found a wide range of applications in aerospace structures who, re high strength-to-weight and high stiffness-to-weight ratios are desired. Fiber-reinforced composite laminates such as graphite/epoxy and Kevlar/epoxy are used to combine with or to replace the conventional aluminum-, titanium-alloy structural components for weight reduction and other improvements.

Figure 3:
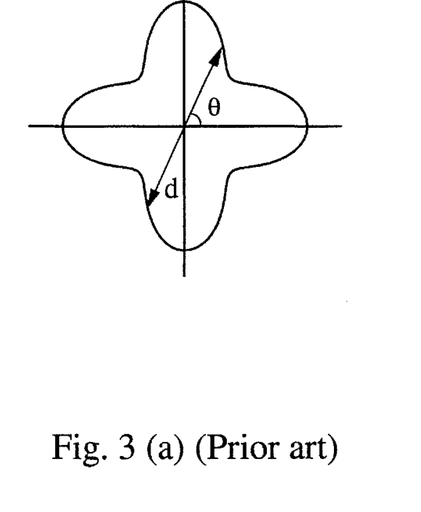
Figure 3B:
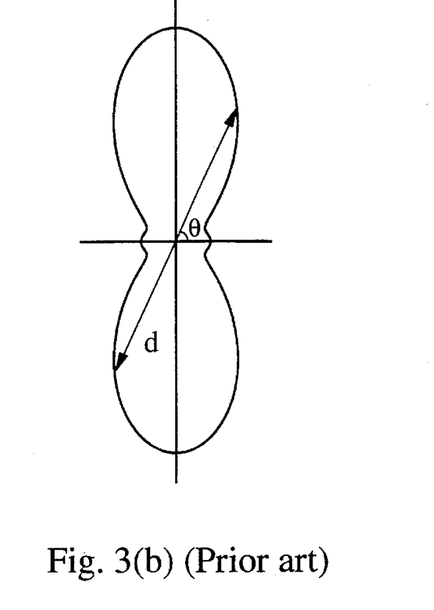

FIGS. 3(a) and 3(b) show polar plots of the extensional and bending stiffnesses of an example, graphite/epoxy laminate, respectively. The length of d indicates the magnitude of the laminate stiffness with respect to the loading in direction $\theta$. Since the laminate stiffnesses vary with $\theta$, the laminate is said to be anisotropic. Note that the degree of anisotropy in the extension and bending stiffnesses are different, which is typical of composite laminates.

Figure 4A:
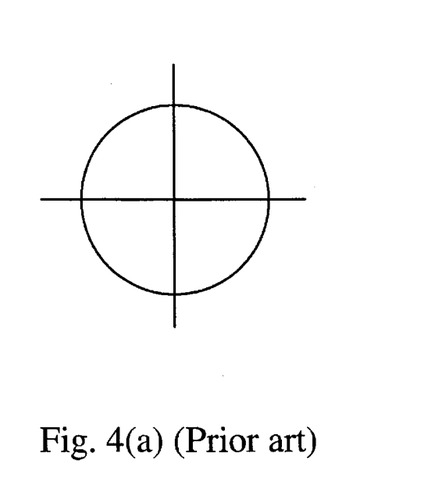
Figure 4B:
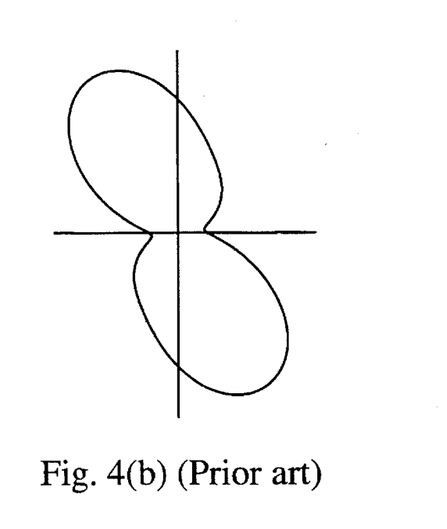

The concept of in-plane isotropic laminates was discovered in 1953 by F. Weiren and C. B. Norris as described in "Mechanical Properties of a Laminate Designed to be Isotropic," Report No. 1841, Forrest Products Laboratory, Forest Service, U. S. Department of Agriculture, May 1953 (Attachment 2) FIGS. 4(a) and 4(b) show plots of the extensional and the bending stiffnesses of such laminates, respectively. In-plane isotropy is characterized by a circular pattern of extensional stiffness; while out-of-plane bending stiffness remains anisotropic. Hence, for the past few decades, a laminate with in-plane isotropy and a symmetric layup has been referred to as an "extensionally isotropic laminate" (hereinafter designated as EIL).

In a 1979 General Motors research report (EM-429, GM restricted), "Isotropic Composite Plates—A Conceptual Approach," K. M. Wu, one of the inventors of the present invention, described the approach for developing the laminate with stiffness isotropy in extension, shear, bending, and twisting. However, due to an incomplete solution scheme, no such laminate was discovered.

U.S. Pat. No. 5,312,670 (1994) awarded to K. M. Wu and B. L. Avery develops the layup of i. a single-material fully isotropic laminate (hereinafter designated as FIL) that exhibits a concomitant stiffness isotropy in extension, shear, bending, and twisting; and ii. a single-material quasi-homogeneous anisotropic laminate (hereinafter designated as QHAL) that has identical stiffness anisotropy in extension and bending as well as in shear and twisting, which use plies of a single nonisotropic material throughout a laminate.

Figure 5A:
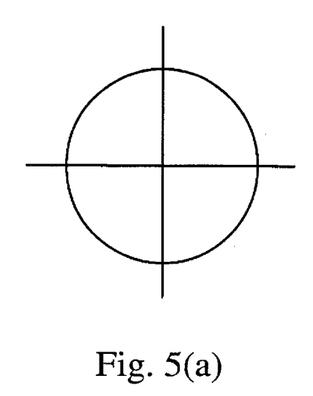
FIGS. 5(a) and 5(b) illustrate the extensional and the bending stiffnesses of an FIL (prior art) respectively, which also represent the characteristics of an MFIL.
Figure 5B:
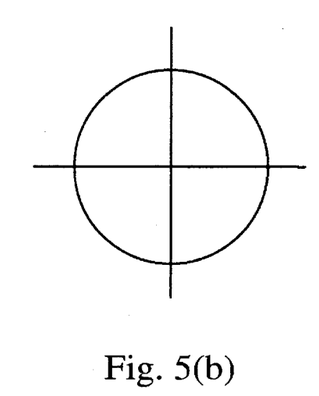
Figure 6A:
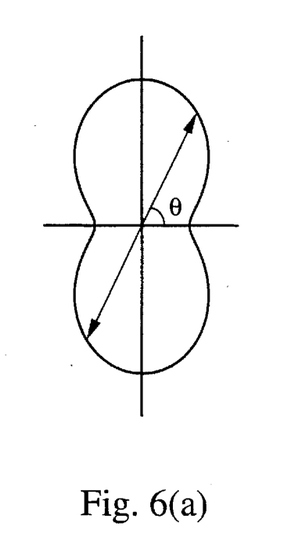
FIGS. 6(a) and 6(b) illustrate the extensional and the bending stiffnesses of an QHAL (prior art) respectively, which also represent the characteristics of an MQHAL.
Figure 6B:
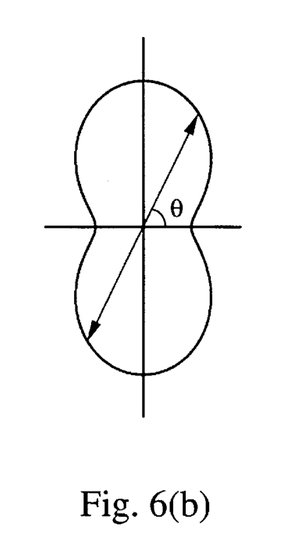

As illustrated in FIGS. 5(a) and 5(b), both extensional and bending stiffnesses of an FIL are indicated by circles for isotropy. This isotropy also exists in the shear and twisting stiffnesses of an FIL layup. The QHAL layup provides identical anisotropy in a laminate for both in-plane and out-of-plane stiffnesses. "Identical anisotropy" stipulates that the stiffness directionalities are identical with respect to extension and bending, as well as to shear and twisting. FIGS. 6(a) and 6(b) show polar plots of the extensional and bending stiffnesses of a QHAL, respectively. Although both stiffnesses are anisotropic, the anisotropy is identical with respect to the angle θ.

Because Wu and Avery also published their invention of the single-material FIL and QHAL layup to the *Journal of Composite Materials* in October 1992, a few research institutes have since become interested in searching for multimaterial counterparts of FIL and QHAL. However, the first and only success has been achieved by the applicants as described in the present invention.

The present invention improves over the FIL and QHAL, and discovers the layup of i. a multimaterial fully isotropic laminate (hereinafter designated as MFIL) that exhibits a concomitant stiffness isotropy in extension, shear, bending, and twisting; and ii. a multimaterial quasi-homogeneous anisotropic laminate (hereinafter designated as MQHAL) that has identical stiffness anisotropy in extension and bending as well as in shear and twisting for composite laminates that require two or more materials. In addition to achieving the stiffness characteristics of FIL and QHAL illustrated in FIGS. 5(a), 5(b), 6(a), and 6(b), the MFIL and the MQHAL layups accommodate the multimaterial requirement and thus introduce further structural weight reduction and material cost saving. Moreover, the MFIL layup leads to the discovery of a substantially new category of FIL, as will be detailed later.

The MFIL and the MQHAL have distinctive applications for load-carrying laminates, i. An MFIL provides the same stiffness reinforcement in all directions, which eliminates the concern for the "weak aspect" in the structural element and eases the engineering consideration of composite laminates.

ii. An MQHAL, with identical anisotropy for both in-plane and out-of-plane stiffnesses, provides the maximum (and minimum) in-plane and out-of-plane reinforcements in the same direction. Thus, an MQHAL is a layup for weight reduction in a laminated structure.

The approaches and models for generating these layups are closely related, as will be described in later sections.

Comparison with Other Inventions Related to Composite Materials (1) U.S. Pat. No. 4,882,230 (1989) to S. B. Warner relates to a process for producing a multilayer polymeric film having dead bend characteristics which refers to the ability of the food-wrap film to remain folded after removal of the folding action (column 1, lines 28–31 of Warner's specification). Dead bend, as a term used by Warner, refers to an irreversible deformation that is not controlled by the bending stiffness of the material. In fact, Warner's process does not teach any method to affect the bending and twisting stiffness of the film. As a result, the bending and twisting stiffnesses of Warner's films are independent of each other and independent of the extensional and shear stiffnesses. In comparison, the present invention teaches the MFIL stacking sequence to concurrently achieve the isotropic extensional, shear, bending, and twisting stiffnesses of a laminate.

(2) U.S. Pat. No. 3,768,760 (1973) to L. C. Jensen teaches a multilayer-multidirectional composite laminate in which graphite fibers are designed to oppose in-plane shear stress (lines 5–8, claim 1 of Jensen). Jensen does not teach any method to affect the extensional, bending, and twisting stiffnesses. As a result, the extensional, shear, bending, and twisting stiffnesses of Jensen's laminates are entirely independent of one another. In comparison, the present invention teaches the MQHAL stacking sequence to reinforce the shear and twisting stiffnesses in the same direction and, concurrently, to reinforce the extensional and bending stiffnesses in the same direction of the laminate.

(3) U.S. Pat. No. 4,621,980 (1986) to Richard T. Reavely et al. relates a process for producing a tubular composite structure, wherein a plurality of fibrous materials are used for the damage tolerance and stiffness reinforcement of the structure. However, Reavely's process emphasizes the stiffness reinforcement only in one direction-the longitudinal axis of the tubular structure. As a result, the extensional, shear, bending, and twisting stiffnesses of its tube wall element are entirely independent of one another in every direction including the longitudinal axis for principal reinforcement. In comparison, the present invention teaches the MQHAL stacking sequence to relate the extensional and bending stiffnesses and to relate the shear and twisting stiffnesses in every direction of a composite panel. Consequently, an MQHAL layup reinforces the extensional and bending stiffnesses in the same direction and, concurrently, reinforces the shear and twisting stiffnesses in the same direction of a laminate.

(4) U.S. Pat. No. 4,848,745 (1989) to John R. Bohannan et al. relates a process for producing a laminated outer shell for a tubular object subject to splintering when impacted at high speed. Bohannan's process emphasizes stiffness reinforcement often in, but not limited to, the longitudinal axis of the tubular object. However, Bohannan's process does not teach any method to relate the extensional and bending stiffnesses or to relate the shear and twisting stiffnesses of the laminated shell in any direction. As a result, the extensional, shear, bending, and twisting stiffnesses of its shell element are entirely independent of one another in every direction. In comparison, the present invention teaches the MQHAL stacking sequence to relate the extensional and bending stiffnesses and to relate the shear and twisting stiffnesses in every direction of a composite panel. Consequently, an MQHAL layup reinforces the extensional and bending stiffnesses in the same direction and, concurrently, reinforces the shear and twisting stiffnesses in the same direction of a laminate.

(5) U.S. Pat. No. 4,946,721 (1990) to Christof Kindervater et. al. teaches a process for producing an energy absorbing composites in the form of tubes or corrugated plates. Though mainly designed for energy absorption, the structure is typically stiffness-reinforced along the direction of pressure application. However, Kindervater's process does not teach any method to relate the extensional and bending stiffnesses or to relate the shear and twisting stiffnesses of the composite in any direction. As a result, the extensional, shear, bending, and twisting stiffnesses of its tube wall element (or corrugated plate element) are entirely independent of one another in every direction. In comparison, the present invention teaches the MQHAL stacking sequence to relate the extensional and bending stiffnesses and to relate the shear and twisting stiffnesses in every direction of a composite panel. Consequently, an MQHAL layup reinforces the extensional and bending stiffnesses in the same direction and, concurrently, reinforces the shear and twisting stiffnesses in the same direction of a laminate.

The stacking sequence to control the extensional, shear, bending, and twisting stiffnesses of a laminate is the central concept in the present invention. It would be unlikely for those skilled in the art to combine the teaching of the above inventions to achieve an MFIL or MQHAL, which are the subject matter of the present invention.

SUMMARY OF THE INVENTION

It is an object of the present invention to provide a multimaterial multi-ply laminate that is in the form of a flat plate or a curved shell.

A further object of the present invention is to provide a multimaterial multi-ply laminate with the same stiffness in all directions, which eliminates the concern for the "weak aspect" in the structural element and eases the engineering consideration of composite laminates.

An additional object of the present invention is to provide a multimaterial multi-ply laminate with identical directionality in the in-plane and out-of-plane stiffness reinforcements, which provides the maximum weight reduction in a structural component.

Accordingly, the present invention discovers the layup of a multimaterial fully isotropic laminate that exhibits the concomitant stiffness isotropy in extension, shear, bending, and twisting; and ii. a multimaterial quasi-homogeneous anisotropic laminate that has identical stiffness anisotropy in extension and bending as well as in shear and twisting.

In addition, layups of the multimaterial fully isotropic laminate lead to a substantially new category of the single-material fully isotropic laminate.

These objects and other features will be apparent to one having ordinary skill in the art from reading the descriptions and claims below.

BRIEF DESCRIPTION OF THE DRAWING

FIGS. 3(a) and 3(b) illustrate the extensional and the bending stiffnesses of an ordinary composite laminate (prior art) respectively.

FIGS. 4(a) and 4(b) illustrate the extensional and the bending stiffnesses of an EIL (prior art) respectively.

DETAILED DESCRIPTION OF THE INVENTION

1. MULTIMATERIAL FULLY ISOTROPIC LAMINATE (MFIL)

1.1 DEFINITION

In the classical lamination theory, the macromechanical behavior of a thin laminate is characterized by an extensional/shear stiffness matrix A, a coupling stiffness matrix B, and a bending/twisting stiffness matrix D in a force-deformation relation:

$$\left\{ \begin{array}{c} N \\ M \end{array} \right\} = \left[ \begin{array}{cc} A & B \\ B & D \end{array} \right] \left\{ \begin{array}{c} \epsilon \\ \kappa \end{array} \right\} \quad (1)$$

In this relation, N and M denote the force and moment intensities through the laminate thickness as shown in FIGS. 2(a) and 2(b), and $\epsilon$ and $\kappa$ represent the strains and curvatures at the midplane of the laminate. A, B, and D are three matrices, each with dimension 3 ×3, computed from the ply material properties and the laminate layup. To indicate the characteristics of the matrix, these three matrices are ordinarily expressed in indicial notation, i.e. $A_{ij}$, $B_{ij}$, and $D_{ij}$ with i, j=1,2,3 indicating the numbers of rows and columns in the matrices. In general, i. these three matrices are independent of one another.

ii. each matrix has six independent coefficients, which amounts to a total of 18 independent coefficients.

However, when applying these matrices to the mechanical analysis of a homogeneous isotropic plate, we obtain the following constraint conditions:

Isotropic extensional/shear (in-plane) stiffness $$A_{ij} = \begin{bmatrix} A_{11} & A_{12} & 0 \\ A_{12} & A_{11} & 0 \\ 0 & 0 & (A_{11}-A_{12})/2 \end{bmatrix} \quad (2)$$

Null coupling stiffness $$B_{ij} = \begin{bmatrix} 0 & 0 & 0 \\ 0 & 0 & 0 \\ 0 & 0 & 0 \end{bmatrix} = 0 \quad (3)$$

Isotropic bending/twisting (out-of-plane) stiffness $$D_{ij} = \frac{t^2}{12} \begin{bmatrix} A_{11} & A_{12} & 0 \\ A_{12} & A_{11} & 0 \\ 0 & 0 & (A_{11}-A_{12})/2 \end{bmatrix} = \frac{t^2}{12} A_{ij} \quad (4)$$

where t is the total thickness of the plate. Note that, for a homogeneous isotropic plate, i. $A_{ij}$ and $D_{ij}$ are no longer independent of each other; instead they are related by the constant $t^2/12$. In addition, $B_{ij}$ is reduced to a null matrix.

ii. Of all three matrices, there are only two independent coefficients, i.e. $A_{11}$ and $A_{12}$.

The above constraints are quite restrictive, however, any multimaterial laminate with three matrices satisfying the conditions in Equations (2) through (4) would have a macromechanical behavior identical to that of a homogeneous isotropic plate. We thus name this type of laminate, upon its invention, as the multimaterial fully isotropic laminate (MFIL).

It will become evident later that the above three equations represent one of the many ways to compare the relevant arts as follows.

EILs (prior art) are the single-material laminates that satisfy Equations (2) and (3).

FILs (prior art) are the single-material laminates that satisfy Equations (2), (3), and (4).

QHALs (prior art) are the single-material laminates that satisfy Equations (3) and (4).

MFILs are the multimaterial laminates that satisfy Equations (2), (3), and (4).

MQHALs are the multimaterial laminates that satisfy Equations (3) and (4).

These definitions will be further elaborated in the following sections.

1.2 PREREQUISITE KNOWLEDGE OF EILs AND FILs (Prior Arts)

As indicated in the Background of the Invention, the development of the MFILs is based on improvements over the EILs and the FILs. Therefore a brief description of these two prior arts are provided in the following. (A cognizant of these two prior arts may skip to section 1.3.)

EILs (by Weiren and Norris, 1953): Single-material laminates that satisfy Equations (2) and (3)

An EIL is a laminate layup consisting of 2MN equal-thickness plies of a single nonisotropic material. The factor of 2 is for the layup symmetry with respect to its midplane. Each half of the laminate consists of MN plies, with M ($\leq 1$) plies aligned at each of the N ($\leq 3$) orientation angles, with the orientation angles equally spaced by $\pi/N$. Such a layup arrangement assures that art EIL satisfy both Equations (2) and (3) for in-plane isotropy and null coupling.

For an EIL layup with three ply orientation angles (N=3), the minimum number (M=1) of plies (2MN) is 6. As the ply numbers of each angle (M) increases, there can be 12, 18, . . . or more plies in the layup with an increment of 6 plies. Hence the minimum number of plies in an EIL with N ply angles is 2N, with possible larger numbers of plies with increments of 2N. Table 1 lists the ply numbers of a few EILs for further clarification.

TABLE 1

The Numbers of Plies in EILs

|   |   | Number of Plies (2 MN) | | | |
|---|---|---|---|---|---|
| N | Characteristic Ply Angles | M = 1 | M = 2 | M = 3 | ... |
| 3 | 0°, ±60° | 6 | 12 | 18 | ... |
| 4 | 0°, ±45°, 90° | 8 | 16 | 24 | ... |
| 5 | 0°, ±36°, ±72° | 10 | 20 | 30 | ... |
| ... | ... | | | ... | |

Figure 7:
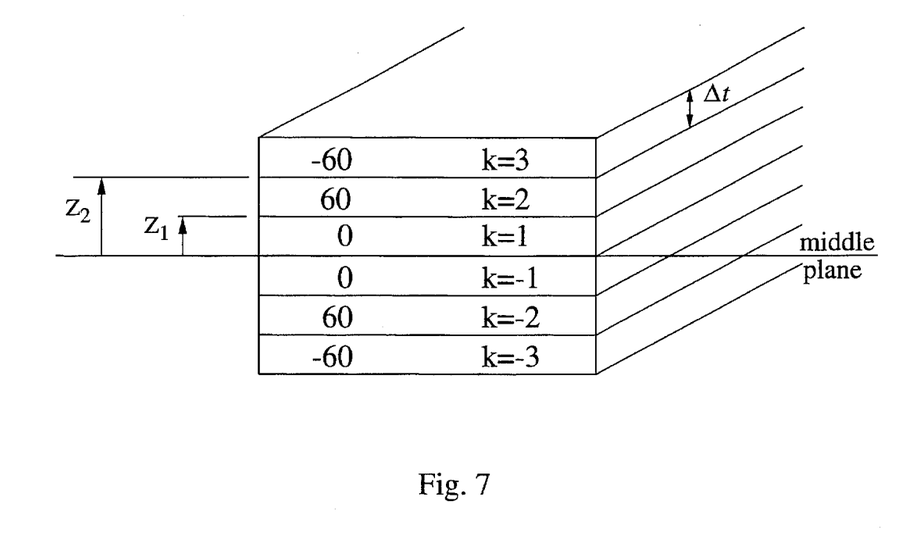
FIG. 7 illustrates the stacking sequence of a 6-ply EIL.

FIG. 7 illustrates a 6-ply EIL that has a stacking sequence of (−60°, 60°, 0°, 0°, 60°, −60°). Because each ply is of uniform thickness $\Delta t$ and the layup is symmetric, we can compute the $A_{ij}$ using the formula in the technical paper "Fully Isotropic Laminates and Quasi-Homogeneous Anisotropic Laminates" that was published to the *Journal of Composite Materials* in October 1992 (Attachment 3).

$$A_{ij} = 2 \sum_{k=1}^{3} (\overline{Q}_{ij})_k (z_k - z_{k-1}) \tag{5}$$

$$= 2 \sum_{k=1}^{3} (\overline{Q}_{ij})_k \Delta t$$

$$= 2(\overline{Q}_{ij}^{(0)} + \overline{Q}_{ij}^{(60)} + \overline{Q}_{ij}^{(-60)}) \Delta t$$

Where $\overline{Q}_{ij}^{\theta}$ with i,j=1,2,3 is a 3×3 matrix that represents the transformed stiffness of the ply at orientation angle $\theta$ with respect to the laminate coordinate system, and $z_k$ and $z_{k-1}$ are the thickness coordinates of the upper and lower surfaces of ply k as illustrated in FIG. 7. In the development of in-plane isotropy, F. Weiren and C. B. Norris (Attachment 2) proved that $$\overline{Q}_{ij}^{(0)} + \overline{Q}_{ij}^{\pi/N} + \ldots + \overline{Q}_{ij}^{(N-1)\pi/N} \quad (N \geq 3) \tag{6}$$

is an isotropic matrix. Therefore, for N=3, $\overline{Q}_{ij}^{(0)} + \overline{Q}_{ij}^{(60)} + \overline{Q}_{ij}^{(-60)}$ isotropic, which renders $A_{ij}$ isotropic as shown in Equation (5). This proof for isotropy is valid for both orthotropic and anisotropic ply materials as long as each $\overline{Q}_{ij}^{\theta}$ is "weighted" or "multiplied" by the identical factors 1:1:1 as in Equation (5).

The condition of equal weighting of $\overline{Q}_{ij}^{\theta}$, however, does not exist in $D_{ij}$ for this 6-ply EIL.

$$D_{ij} = \frac{2}{3} \sum_{k=1}^{3} (\overline{Q}_{ij})_k (z_k^3 - z_{k-1}^3) \tag{7}$$

$$= \frac{2}{3} \sum_{k=1}^{3} (\overline{Q}_{ij})_k (3k^2 - 3k + 1)(\Delta t)^3$$

$$= \frac{2}{3} (1\overline{Q}_{ij}^{(0)} + 7\overline{Q}_{ij}^{(60)} + 19\overline{Q}_{ij}^{(-60)})(\Delta t)^3$$

In the above equation, the proportion of weighting factors 1:7:19 on $\overline{Q}_{ij}^{\theta}$ depends on the offset distance of individual plies from the midplane, which is different from the proportion 1:1:1 required for an isotropic matrix. Thus, $D_{ij}$ is anisotropic and the laminate is not fully isotropic.

FILs (U.S. Pat. No. 5,312,670 (1994) to Wu and Avery, also published to the *Journal of Composite Materials* in 1992): Single-material laminates that satisfy Equations (2), (3), and (4)

FILs were obtained by varying the stacking sequences of the EILs until Equation (4) is also satisfied.

Table 2 lists an FIL and the pertinent data for illustration of full isotropy. Due to the symmetry with respect to the midplane, only the stacking sequence in half thickness of the laminate is listed. The ply located immediately adjacent to the laminate midplane is designated as ply 1 in the table. The one next to ply 1 is ply 2, . . . , and so on. $\theta_1$ through $\theta_3$ indicate any three orientation angles equally spaced by $\pi/3$.

In Table 2, the second row Ply ID (k) specifies the ply stacking sequence.

The third row, $3k^2-3k+1$, lists the value of the weighting factor associated with each ply for $D_{ij}$.

The fourth row shows the number of plies in each orientation. Clearly, the isotropy of $A_{ij}$ is preserved as each orientation angle has the same number (i.e. 6) of plies. The effect of the ply numbers on the isotropy of $A_{ij}$ can be seen as follows.

TABLE 2

A π/3-type 36-ply FIL

| Angle | $\theta_1$ | | | | $\theta_2$ | | | | $\theta_3$ | | | |
|---|---|---|---|---|---|---|---|---|---|---|---|---|
| Ply ID (k) | 1 | 2 | 3 | 13 | 4 | 6 | 8 | 11 | 5 | 7 | 9 | 10 |
|  | 15 | 17 | | | 12 | 18 | | | 14 | 16 | | |
| $3k^2 - 3k + 1$ | 1 | 7 | 19 | 469 | 37 | 91 | 169 | 331 | 61 | 127 | 217 | 271 |
|  | 631 | 817 | | | 397 | 919 | | | 547 | 721 | | |
| Weighting factor for $A_{ij}$ (No. of plies) | 6 | | | | 6 | | | | 6 | | | |
| Weighting factor for $D_{ij}$ ($\Sigma 3k^2 - 3k + 1$) | 1944 | | | | 1944 | | | | 1944 | | | |

$$A_{ij} = 2 \sum_{k=1}^{18} (\overline{Q}_{ij})_k \Delta t \quad (8)$$

$$= 2\left(\sum_{k=1,2,3,13,15,17} \overline{Q}_{ij}^{\theta_1} + \sum_{k=4,6,8,11,12,18} \overline{Q}_{ij}^{\theta_2} + \sum_{k=5,7,9,10,14,16} \overline{Q}_{ij}^{\theta_3}\right) \Delta t$$

$$= 2(6\overline{Q}_{ij}^{\theta_1} + 6\overline{Q}_{ij}^{\theta_2} + 6\overline{Q}_{ij}^{\theta_3})\Delta t$$

$$= 12(\overline{Q}_{ij}^{\theta_1} + \overline{Q}_{ij}^{\theta_2} + \overline{Q}_{ij}^{\theta_3})\Delta t$$

In Table 2, the fifth row sums the ply weighting factors at the third row to attain the orientation weighting factors for $D_{ij}$. As each orientation angle has the same weighting factor, 1944, the isotropy of $D_{ij}$ is obtained. The effect of this factor can be seen through computation of $D_{ij}$ as follows.

$$A_{ij} = \frac{2}{3} \sum_{k=1}^{18} (3k^2 - 3k + 1)(\overline{Q}_{ij})_k (\Delta t)^3 \quad (9)$$

$$= \frac{2}{3}\left[\sum_{k=1,2,3,13,15,17}(3k^2-3k+1)\overline{Q}_{ij}^{\theta_1} + \sum_{k=4,6,8,11,12,18}(3k^2-3k+1)\overline{Q}_{ij}^{\theta_2} + \sum_{k=5,7,9,10,14,16}(3k^2-3k+1)\overline{Q}_{ij}^{\theta_3}\right](\Delta t)^3$$

$$= \frac{2}{3}(1944\overline{Q}_{ij}^{\theta_1} + 1944\overline{Q}_{ij}^{\theta_2} + 1944\overline{Q}_{ij}^{\theta_3})(\Delta t)^3$$

$$= 1296(\overline{Q}_{ij}^{\theta_1} + \overline{Q}_{ij}^{\theta_2} + \overline{Q}_{ij}^{\theta_3})(\Delta t)^3$$

$$= \frac{t^2}{12} A_{ij}$$

where $t=36\Delta t$. Because $\theta_1$ through $\theta_3$ represent three angles equally spaced by $\pi/3$, the proportion of weighting factors 1:1:1 for three $\overline{Q}_{ij}^{\theta}$'s in both Equations (8) and (9) signifies the necessary and sufficient condition for full isotropy as described in Equations (2) through (4). Thus, a $\pi/3$-type FIL is invented and verified.

In summary, both the EILs and the FILs are laminates made of single nonisotropic material. The laminate isotropy is based on the Weiren-Norris expression in Equation (6) which states that $$\overline{Q}_{ij}^{(0)} + \overline{Q}_{ij}^{\pi/N} + \ldots + \overline{Q}_{ij}^{(N-1)\pi/N} \quad (N \geq 3)$$

is an isotropic matrix.

1.3 TERMINOLOGY AND NOTATION FOR MULTIMATERIAL LAMINATES

For a multimaterial laminate, the term "material-orientation" is defined as the combination of the ply material and its orientation angle, thus i. A nonisotropic material oriented at certain angle represents a distinct material-orientation. A nonisotropic material can have as many material-orientations as the number of its orientation angles. Each nonisotropic material forms a distinct set of material-orientations.

ii. An isotropic material with identical property in all directions, represents only one material-orientation. However, each isotropic material forms a distinct material-orientation.

Note that in a single-material laminate, the term "material-orientation" is synonymous with the term "orientation".

In addition, a multimaterial laminate requires a new notation system. $\overline{Q}_{ij}^{\theta}$ that denotes the transformed stiffness in a single-material laminate has to be expanded to accommodate the multimaterial laminates:

i. $P_m^{\theta}$ replaces $\overline{Q}_{ij}^{\theta}$ as the 3×3 transformed stiffness matrix of the ply of a nonisotropic material. $\theta$ is the ply orientation angle, and m represents the index of various nonisotropic materials. Although the indicial notation ij is not used, the matrix characteristic of $P_m^{\theta}$ remains.

ii. $I_m$ replaces $\overline{Q}_{ij}^{\theta}$ as the 3×3 transformed stiffness matrix of the ply of an isotropic material. "I" denotes isotropy, and m represents the index of various isotropic materials. $\theta$ is not used with $I_m$ because isotropy requires the property to be the same in every direction. Similarly, although the indicial notation ij is not used, the matrix characteristic of $I_m$ remains.

With the multimaterial notation, the single-material Weiren-Norris expression in Equation (6) can be rewritten as, $$P_1^{(0)} + P_1^{\pi/N} + \ldots P_1^{(N-1)\pi/N} \quad (N \geq 3) \quad (10)$$

where the same material index subscript (i.e. 1) associated with every term indicates that the same nonisotropic material is used for all plies.

Furthermore, because rotating a laminate by an angle $\theta$ with respect to the coordinate system does not affect the isotropy of the laminate, the Weiren-Norris expression can also be written as, $$P_1^{\theta} + P_1^{\theta+\pi/N} + \ldots + P_1^{\theta+(N-1)\pi/N} \quad (N \geq 3) \quad (11)$$

1.4 GENERAL FORMULA FOR MULTIMATERIAL LAMINATES

The present invention essentially expands the Weiren-Norris expression into a general formula for the isotropy of multimaterial laminates:

$$a_1 I_1 + a_2 I_2 + \ldots + a_i I_i + b_1 [P_1^{\theta_1} + P_1^{\theta_1+\pi/N_1} + \ldots + P_1^{\theta_1+(N_1-1)\pi/N_1}] + \\ b_2 [P_2^{\theta_2} + P_2^{\theta_2+\pi/N_2} + \ldots + P_2^{\theta_2+(N_2-1)\pi/N_2}] + \\ b_3 [P_3^{\theta_3} + P_3^{\theta_3+\pi/N_3} + \ldots + P_3^{\theta_3+(N_3-1)\pi/N_3}] + \\ b_4 [P_2^{\theta_4} + P_2^{\theta_4+\pi/N_4} + \ldots + P_2^{\theta_4+(N_4-1)\pi/N_4}] + \ldots + \\ b_r [P_n^{\theta_r} + P_n^{\theta_r+\pi/N_r} + \ldots + P_n^{\theta_r+(N_r-1)\pi/N_r}] \quad (12)$$

$(N_1, \ldots, N_r \geq 3)$

In Equation (12), i. $I_1$ through $I_i$ represent the stiffness matrices of i distinct isotropic materials;

ii. $P_1^{\theta}$ through $P_n^{\theta}$ represent the transformed stiffness matrices of n distinct nonisotropic materials at the orientation angle $\theta$;

iii. the sum of the nonisotropic matrices $P_m^{\theta}$ within each square bracket [. . . ] forms an isotropic matrix for an EIL, according to Equation (11);

iv. a's and b's are constant multipliers that do not affect the property of the matrices, Mathematically, Equation (12) represents the sum of isotropic matrices, which is an isotropic matrix.

Physically, Equation (12) represents the stiffness of a multimaterial laminate consisting of plies made of i isotropic materials and r EILs made of n nonisotropic materials. This laminate, with a symmetric layup, satisfies both Equations (2) and (3) for in-plane isotropy and null coupling and is named the multimaterial EIL (hereinafter designated as MEIL).

Note that Equation (12) allows the same nonisotropic material to form more than one EILs in the MEIL, as indicated by the multiple appearance of $P_1^\theta$ different square brackets. Therefore, plies of different EILs may have the same material-orientation. This condition does not affect the isotropy of the laminate. (Nevertheless, it can be prevented by simply rotating each of the involved EILs by certain angle with respect to the others.)

Evenly-Oriented Sublaminate

In a laminate consisting of multiple EILs, a constituent EIL does not necessarily remain as an integral part by itself. For example, in a symmetric laminate, each constituent EIL has to be separated into two halves; one for the upper part and one for the lower part of the laminate. Consequently, plies of the same EIL no longer remain adjacent-they become interleaved with other plies in the laminate. We thus define the detached state of an EIL as an evenly-oriented sublaminate hereinafter. (This definition will be further illustrated using Tables 4 and 5.)

1.5 APPROACH AND MODEL OF MFILs (Present Invention)

MFILs are obtained by varying ("shuffling") the stacking sequences of the MFILs until Equation (4) is also satisfied. Note the following:

i. Varying the stacking sequence without changing any ply orientation angle in an MEIL preserves the in-plane extensional/shear isotropy required by Equation (2).

ii. Only the stacking sequence in half of a layup can be varied independently; the other half are usually (not necessarily) stacked symmetrically to assure that $B_{ij}=0$ as required by Equation (3).

Obviously, for an MEIL with few plies the possible combinations of stacking sequences are limited; so an MFIL may not exist. However, the combinations of stacking sequences increase rapidly as the number of plies increases. Hence, the possibility of finding an MFIL layup increases as the number of plies increases. This mechanics problem is thus reduced to an integer problem (hereinafter designated as the MFIL Integer Model) as follows:

There is a series of K integers expressed as 1, 7, 19, ... , $3K^2 - 3K+1$. These K integers are to be distributed into a number of groups such that the proportion of the numbers of integers in each group equals $a_1: a_2: a_3: \ldots : a_i: b_1: b_1: b_1: \ldots : b_r: b_r$. The objective is to fin distribution pattern of integers such that ratio of the sums in every integer group also equals $a_1: a_2: a_3: \ldots : a_i: b_1: b_1: b_1: \ldots : b_r: b_r$. (Note that each of the b's repeats for at least three times with the same subscript index.)

We know that, in the above model, the integer K is associated with the total number of plies, which have the identical uniform thickness. Each of the a's corresponds to the plies of an isotropic material. Each of the b's, repeating for at least three times, corresponds to the plies in each orientation of a constitutive Ell in the MEIL assembly.

A computer program has been developed to systematically search through all the distribution patterns. Each integer distribution pattern that satisfies the objective constitutes a stacking sequence for an MFIL. Some solutions are listed below for explanation.

1.6 PARTIAL LISTING OF THE MFILs

The computerized search using the MFIL integer model has discovered a series of MFIL solutions. For illustration, part of the solutions are listed in the following.

(a) MFIL with multiple isotropic materials

A laminate consisting of only one isotropic material behaves like an isotropic plate and satisfies Equations (2) through (4)—this is common knowledge and not a part of the present invention.

However, a symmetric laminate consisting of multiple isotropic materials usually satisfies only Equations (2) and (3). $A_{ij}$ and $D_{ij}$ are both isotropic but not related by the constant $t^2/12$ to qualify as an MFIL unless specific stacking sequences are adopted.

Table 3 lists the stacking sequence solution of a 14-ply symmetric MFIL with two distinct isotropic materials forming a total of two material-orientations.

Due to the symmetry with respect to midplane, only the stacking sequence in half thickness of the laminate is listed. The ply located immediately adjacent to the laminate midplane is designated as ply 1 in the table. The one next to ply 1 is ply 2, ... and so on.

TABLE 3

A 14-ply symmetric MFIL of two isotropic materials with $a_1:a_2 = 5:2$

| Material | Isotropic ($I_1$) | | | | | Isotropic ($I_2$) | |
|---|---|---|---|---|---|---|---|
| Ply ID (k) | 1 | 3 | 4 | 5 | 7 | 2 | 6 |
| $3k^2 - 3k + 1$ | 1 | 19 | 37 | 61 | 127 | 7 | 91 |
| Weighting factor for $A_{ij}$ (No. of plies) | 5 | | | | | 2 | |
| Weighting factor for $D_{ij}$ ($\Sigma 3k^2 - 3k + 1$) | 245 | | | | | 98 | |

In Table 3, the first row indicates that there are two isotropic materials; the second row Ply ID (k) specifies the ply stacking sequence.

The third row, $3k^2-3k+1$, lists the value of the weighting factor associated with each ply for $D_{ij}$.

The fourth row shows the number of plies in each isotropic material. The effect of the ply numbers on $A_{ij}$ can be seen in the following equation, in which the stiffness matrix $(\overline{Q}_{ij})_k$ is substituted with $I_m$ to indicate the isotropy of each ply.

$$A_{ij} = 2 \sum_{k=1}^{7} (\overline{Q}_{ij})_k \Delta t \qquad (13)$$

$$= 2 \left( \sum_{k=1,3,5,7} I_1 + \sum_{k=2,6} I_2 \right) \Delta t$$

$$= (5I_1 + 2I_2)\Delta t$$

In Table 3, the fifth row sums the ply weighting factors in the third row to attain the weighting factors for $D_{ij}$, in which the ratio of 245:98 can be equated to 5:2 of $A_{ij}$ [Having the same ratio of weighting factors in both $A_{ij}$ and $D_{ij}$ is the key of the present invention to satisfy Equation (4)]. The effect of these factors can be seen through the computation of $D_{ij}$ as follows.

$$D_{ij} = \frac{2}{3} \sum_{k=1}^{7} (3k^2 - 3k + 1)(\overline{Q}_{ij})_k (\Delta t)^3 \qquad (14)$$

$$= \frac{2}{3} \left[ \sum_{k=1,3,4,5,7} (3k^2 - 3k + 1)I_1 + \sum_{k=2,6} (3k^2 - 3k + 1)I_2 \right] (\Delta t)^3$$

$$= \frac{2}{3} (245 I_1 + 98 I_2)(\Delta t)^3$$

$$= \frac{98}{3} (5I_1 + 2I_2)(\Delta t)^3$$

$$= \frac{t^2}{12} A_{ij}$$

where the total laminate thickness $t=14 \Delta t$. Because $I_1$ and $I_2$ are isotropic, $5I_1+2I_2$ is isotropic. Therefore, Equations (13) and (14) prove the condition for full isotropy as described in Equations (2) through (4). Thus, an MFIL with multiple isotropic materials is invented and verified.

Apparently, if we combine the adjacent plies of the same material into a relative thick ply, we can refer to the MFIL in Table 3 as a 9-ply laminate. Although there are many more MFILs with various numbers of plies and isotropic materials, a complete list is omitted due to page limitation.

(b) MFIL with multiple nonisotropic materials

Table 4 lists the stacking sequence of a 50-ply symmetric MFIL with two distinct nonisotropic materials forming a total of seven material-orientations.

Due to the symmetry with respect to midplane, only the stacking sequence in half thickness of the laminate is listed. The ply located immediately adjacent to the laminate midplane is designated as ply 1 in the table. The one next to ply 1 is ply 2, ..., and so on. $\theta_1$ through $\theta_3$ indicate any three orientation angles equally spaced by $\pi/3$. $\phi_1$ through $\phi_4$ indicate any four orientation angles equally spaced by $\pi/4$.

$$D_{ij} = \frac{2}{3} \sum_{k=1}^{25} (3k^2 - 3k + 1)(\overline{Q}_{ij})_k (\Delta t)^3$$

$$= \frac{2}{3} [1875(P_1^{\theta_1} + P_1^{\theta_2} + P_1^{\theta_3}) +$$

$$2500(P_2^{\phi_1} + P_2^{\phi_2} + P_2^{\phi_3} + P_2^{\phi_4})](\Delta t)^3$$

$$= \frac{1250}{3} [3(P_1^{\theta_1} + P_1^{\theta_2} + P_1^{\theta_3} +$$

$$4(P_2^{\phi_1} + P_2^{\phi_2} + P_2^{\phi_3} + P_2^{\phi_4})](\Delta t)^3$$

$$= \frac{t^2}{12} A_{ij}$$

where the total laminate thickness $t = 50 \Delta t$. Because $P_1^{\theta_1} + P_1^{\theta_2} + P_1^{\theta_3}$ and $P_2^{\phi_1} + P_2^{\phi_2} + P_2^{\phi_3} + P_2^{\phi_4}$ are both isotropic according to Equation (11), $A_{ij}$ and $D_{ij}$ are isotropic. Thus, Equation (15) proves the condition for full isotropy as

TABLE 4

A 50-ply MFIL of two nonisotropic materials with $b_1:b_2 = 3:4$

| Material | Nonisotropic ($P_1$) | | | | | | Nonisotropic ($P_2$) | | | | | | | |
|---|---|---|---|---|---|---|---|---|---|---|---|---|---|---|
| Angle | $\theta_1$ | | $\theta_2$ | | $\theta_3$ | | $\phi_1$ | | $\phi_2$ | | $\phi_3$ | | $\phi_4$ | |
| Ply ID (k) | 1 | 9 | 3 | 13 | 7 | 16 | 2 | 5 | 4 | 12 | 6 | 11 | 8 | 10 |
|  | 24 |  | 22 |  | 19 |  | 15 | 25 | 14 | 23 | 17 | 21 | 18 | 20 |
| $3k^2 - 3k + 1$ | 1 | 217 | 19 | 469 | 127 | 721 | 7 | 61 | 37 | 397 | 91 | 331 | 169 | 271 |
|  | 1657 |  | 1387 |  | 1027 |  | 631 | 1801 | 547 | 1519 | 817 | 1261 | 919 | 1141 |
| Weighting factor for $A_{ij}$ (No. of plies) | 3 | | 3 | | 3 | | 4 | | 4 | | 4 | | 4 | |
| Weighting factor for $D_{ij}$ ($\Sigma 3k^2 - 3k + 1$) | 1875 | | 1875 | | 1875 | | 2500 | | 2500 | | 2500 | | 2500 | |

In Table 4, the first row indicates that there are two nonisotropic materials; the second row indicates the ply orientation angles associated with each material; the third row Ply ID (k) specifies the ply stacking sequence.

The fourth row, $3k^2-3k+1$, lists the value of the weighting factor associated with each ply for $D_{ij}$.

The fifth row shows the number of plies in each material-orientation. The sixth row sums the ply weighting factors in the fourth row to attain the weighting factors for $D_{ij}$, in which the ratio of 1875:2500 can be equated to 3:4 of $A_{ij}$ [Having the same ratio of weighting factors in both $A_{ij}$ and $D_{ij}$ is the key of the present invention to satisfy Equation (4)]. Using the same computing procedures in Equations (13) and (14), we can obtain $A_{ij}$ and $D_{ij}$ as follows. Note that in the following equations, each stiffness matrix $(\overline{Q}_{ij})_k$ is substituted with $P_m^{\theta}$ to indicate the nonisotropy of each ply.

$$A_{ij} = 2 \sum_{k=1}^{25} (\overline{Q}_{ij})_k \Delta t \quad (15)$$

$$= 2[3(P_1^{\theta_1} + P_1^{\theta_2} + P_1^{\theta_3} +$$

$$4(P_2^{\phi_1} + P_2^{\phi_2} + P_2^{\phi_3} + P_2^{\phi_4} +)]\Delta t$$

described in Equations (2) through (4) and an MFIL with multiple nonisotropic materials is invented and verified.

Table 4 is a good example to further clarify the definition of the evenly-oriented sublaminate. The MFIL consists of two evenly-oriented sublaminates formed by two distinct nonisotropic materials. One sublaminate has three plies in each orientation, the other has four plies in each orientation. The stacking sequence at the third row PLY ID (k) of the table clearly shows the plies of these two sublaminates interleaving with each other. In other words, each evenly-oriented sublaminate is an EIL in detached state.

Apparently, if we combine the adjacent plies of the same material-orientation into a relative thick ply, we can consider the MFIL in Table 4 as a 49-ply laminate. Although there are many more MFILs with various numbers of plies and nonisotropic materials, a complete list is omitted due to page limitation.

(c) MFIL with isotropic and nonisotropic materials

Table 5 lists the stacking sequence of a 28-ply symmetric MFIL with one isotropic and one nonisotropic materials, which form a total of four material-orientations.

Due to the symmetry with respect to midplane, only the stacking sequence in half thickness of the laminate is listed. The ply located immediately adjacent to the laminate midplane is designated as ply 1 in the table. The one next to ply 1 is ply 2, ... and so on. $\theta_1$ through $\theta_3$ indicate any three orientation angles equally spaced by $\pi/3$.

TABLE 5

A 28-ply MFIL of isotropic and nonisotropic materials with
$a_1:b_1 = 2:4 = 1:2$

| Material | Isotropic ($I_1$) | Nonisotropic ($P_1$) | | | | | | | | | | | |
|---|---|---|---|---|---|---|---|---|---|---|---|---|---|
| Angle | — | $\theta_1$ | | | | $\theta_2$ | | | | $\theta_3$ | | | |
| Ply ID (k) | 5  11 | 1 | 3 | 9 | 14 | 2 | 4 | 10 | 13 | 6 | 7 | 8 | 12 |
| $3k^2 - 3k + 1$ | 61  331 | 1 | 19 | 217 | 547 | 7 | 37 | 271 | 469 | 91 | 127 | 169 | 397 |
| Weighting factor for $A_{ij}$ (No. of plies) | 2 | 4 | | | | 4 | | | | 4 | | | |
| Weighting factor for $D_{ij}$ ($\Sigma 3k^2 - 3k + 1$) | 392 | 784 | | | | 784 | | | | 784 | | | |

In Table 5, the first row indicates that there are two materials, isotropic and nonisotropic. The second row indicates the ply orientation angles associated with the nonisotropic material; no angle is indicated for the isotropic material because of the identical property in all directions. The third row Ply ID (k) specifies the ply stacking sequence.

The fourth row, $3k^2-3k+1$, lists the value of the weighting factor associated with each ply for $D_{ij}$.

The fifth row shows the number of plies in each material-orientation. The sixth row sums the ply weighting factors in the fourth row to attain the weighting factors for $D_{ij}$, in which the ratio of 392:784 can be equated to 2:4 of $A_{ij}$, and eventually to 1:2 [Having the same ratio of weighting factors in both $A_{ij}$ and $D_{ij}$ is the key of the present invention to satisfy Equation (4)]. Using the same computing procedures in Equations (13) and (14), we can obtain $A_{ij}$ and $D_{ij}$ as follows. Note that in the following equations, each stiffness matrix $(\overline{Q}_{ij})_k$ is substituted with $I_m$ and $P_m^\theta$ to indicate the property of each ply.

$$A_{ij} = 2 \sum_{k=1}^{14} (Q_{ij})_k \Delta t \qquad (16)$$
$$= 2[2I_1 + 4(P_1^{\theta_1} + P_1^{\theta_2} + P_1^{\theta_3})]\Delta t$$
$$= 4[I_1 + 2(P_1^{\theta_1} + P_1^{\theta_2} + P_1^{\theta_3})]\Delta t$$

$$D_{ij} = \frac{2}{3} \sum_{k=1}^{14} (3k^2 - 3k + 1)(Q_{ij})_k (\Delta t)^3$$
$$= \frac{2}{3} [392 I_2 + 784(P_1^{\theta_1} + P_1^{\theta_2} + P_1^{\theta_3})](\Delta t)^3$$
$$= \frac{784}{3} [I_1 + 2(P_1^{\theta_1} + P_1^{\theta_2} + P_1^{\theta_3})] \Delta t)^3$$
$$= \frac{t^2}{12} A_{ij}$$

where the total laminate thickness $t=28 \Delta t$. Because $P_1^{\theta_1} + P_1^{\theta_2} + P_1^{\theta_3}$ isotropic according to Equation (11), $A_{ij}$ and $D_{ij}$ are isotropic. Thus, Equation (16) proves the condition for full isotropy as described in Equations (2) through (4) and an MFIL with isotropic and nonisotropic materials is invented and verified.

As shown, the MFIL consists of one evenly-oriented sublaminate formed by the nonisotropic material. In the MFIL stacking sequence, plies of this sublaminate interleave with the isotropic plies and represent an EIL in detached state as we emphasize repeatedly.

Apparently, if we combine the adjacent plies of the same material-orientation into a relative thick ply, we can consider the MFIL in Table 5 as a 23-ply laminate.

Although there are many more MFILs with various numbers of plies and materials, a complete list is omitted due to page limitation.

1.7 EXAMPLE FOR USING THE INVENTION

In the following, the MFIL layup in Table 5 is used to illustrate the process of constructing a laminate of the present invention.

First, we prepare 4 plies made of the same isotropic material; prepare 24 plies made of the same nonisotropic material (all 28 plies are of the same thickness); and let $\theta_1$ equal 0 degrees, $\theta_2$ equal 60 degrees, and $\theta_3$ equal −60 degrees. Following the stacking sequence specified at the third row of of Table 5, a nonisotropic ply is selected as ply 1 and aligned at 0 degrees, ply 2 is nonisotropic and aligned at 60 degrees, ply 3 is nonisotropic and aligned at 0 degrees, ply 4 is nonisotropic and aligned at 60 degrees, ply 5 is isotropic and thus aligned arbitrarily, ply 6 is nonisotropic and aligned at −60 degrees, and so forth until all 14 plies have been laid up. Make two of these laminates such that when bonded together they form a 28-ply laminate with the two ply 1's adjacent to each other, the midplane of the laminate located between the two ply 1's, and the corresponding plies are aligned (i.e. ply 1 to ply 1, ply 2 to ply 2, and so forth). Thus, an MFIL is constructed.

Similar techniques can be used to construct all the laminates of the present invention.

2. MULTIMATERIAL QUASI-HOMOGENEOUS ANISOTROPIC LAMINATES (MQHAL)

2.1 DEFINITION

An MQHAL is a multimaterial laminate that has identical stiffness anisotropy in extension and bending as well as in shear and twisting, In the classical lamination theory, the macromechanical behavior of an MQHAL is characterized by Equations (3) and (4), i.e.

$$B_{ij} = 0 \qquad (3)$$

$$D_{ij} = \frac{t^2}{12} A_{ij} \qquad (4)$$

Equation (3) is for the null coupling stiffness that can be satisfied with a symmetric layup.

Equation (4) is for a constant relationship between the matrices $A_{ij}$ and $D_{ij}$. Note that, with the removal of Equation (2) for isotropy requirement, both $A_{ij}$ and $D_{ij}$ are allowed to become anisotropic. However, related by the constant $t^2/12$ in Equation (4), both matrices are required to have the identical anisotropy. The following describes the approaches to meet this requirement and obtain an MQHAL.

2.2 APPROACHES FOR MQHALs

An MQHAL layup can be obtained by altering an MFIL in the following ways:

Remove the constraint on angles of the evenly-oriented sublaminate such that the angles are no longer equally-spaced by π/N (plies of the same material-orientation must be changed in unison to the same new angle); and/or Replace the isotropic plies with nonisotropic plies (plies of the same isotropic material must be changed in unison to the same new nonisotropic material and orientation).

These approaches would be further clarified by the solutions shown in the following sections.

2.3 PARTIAL LISTING OF THE MQHALs (a) MQHAL with multiple nonisotropic materials By altering the ply materials in Table 3, Table 6 lists the stacking sequence solution of a 14-ply symmetric MQHAL with two nonisotropic materials forming a total of two material-orientations.

Due to the symmetry with respect to midplane, only the stacking sequence in half thickness of the laminate is listed. The ply located immediately adjacent to the laminate midplane is designated as ply 1 in the table. The one next to ply 1 is ply 2, . . . , and so on.

TABLE 6

A 14-ply symmetric MQHAL of two nonisotropic materials with $b_1:b_2 = 5:2$

| Material Angle | Nonisotropic ($P_1$) $\theta$ | | | | | Nonisotropic ($P_2$) $\phi$ | |
|---|---|---|---|---|---|---|---|
| Ply ID (k) | 1 | 3 | 4 | 5 | 7 | 2 | 6 |
| $3k^2 - 3k + 1$ | 1 | 19 | 37 | 61 | 127 | 7 | 91 |
| Weighting factor for $A_{ij}$ (No. of plies) | 5 | | | | | 2 | |
| Weighting factor for $D_{ij}$ ($\Sigma 3k^2 - 3k + 1$) | 245 | | | | | 98 | |

In Table 6, the first row indicates that there are two nonisotropic materials. The second row indicates the ply orientation angle associated with each material. The third row Ply ID (k) specifies the ply stacking sequence.

The fourth row, $3k^2-3k+1$, lists the value of the weighting factor associated with each ply for $D_{ij}$.

The fifth row shows the number of plies in each material-orientation. The sixth row sums the ply weighting factors in the fourth row to attain the weighting factors for $D_{ij}$, in which the ratio of 245:98 can be equated to 5:2 of $A_{ij}$ [Having the same ratio of weighting factors in both $A_{ij}$ and $D_{ij}$ is the key of the present invention to satisfy Equation (4)]. Using Equations (13) and (14) and replacing $I_1$ and $I_2$ with $P_1$ and $P_2$ respectively, we can prove that $A_{ij}$ and $D_{ij}$ satisfy Equation (4). Because $5P_1+2P_2$ is anisotropic, an MQHAL with multiple nonisotropic materials is invented and verified.

Apparently, if we combine the adjacent plies of the same material into a relatively thick ply, we can refer to the MQHAL in Table 6 as a 9-ply laminate. Although there are many more MQHALs with various numbers of plies and nonisotropic materials, a complete list is omitted due to page limitation.

(b) MQHAL with isotropic and nonisotropic materials

Taking the MFIL layup listed in Table 5 and removing the constraint on $\theta_1$, $\theta_2$, and $\theta_3$ such that all three angles are independent of one another, we can readily obtain a 28-ply symmetric MQHAL with one isotropic and one nonisotropic materials, which form a total of four material-orientations.

Equation (16) is still valid in proving that $A_{ij}$ and $D_{ij}$ satisfy Equation (4). However, because $\theta_1$ through $\theta_3$ are now independent of one another, $P_1^{\theta_1}+P_1^{\theta_2}+P_1^{\theta_3}$ becomes nonisotropic; and so do $A_{ij}$ and $D_{ij}$ as indicated by Equation (16). Thus, an MQHAL with isotropic and nonisotropic materials is invented and verified.

Although there are many more MQHALs with various numbers of plies and materials, a complete list is omitted due to page limitation.

3. APPLICATIONS OF MFIL & MQHAL AS PLATES AND SHELLS

The MFIL and the MQHAL have very useful applications for load-carrying laminates, i. An MFIL provides the same stiffness reinforcement in all directions, which eliminates the concern for the "weak aspect" in the structural element and eases the engineering consideration of composite laminates, ii. An MQHAL, with identical anisotropy in both $A_{ij}$ and $D_{ij}$, provides the maximum (and minimum) in-plane and out-of-plane reinforcements in the same direction. Thus, an MQHAL is a layup for weight reduction in a laminated structure.

In addition, the MFIL and the MQHAL have greatly reduced the effort that is necessary for analyzing their macromechanical response.

Because of the structural complexity in a laminate, it has always been a tedious and complicated task to perform a mechanical analysis that involves all three matrices, $A_{ij}$, $B_{ij}$, and $D_{ij}$. The basic complication to a mechanical analysis is due to the fact that $A_{ij}$ and $D_{ij}$ are independent of each other in most of the laminates. However, this complication is removed by the present invention. First, in the MFIL and the MQHAL layups, $A_{ij}$ and $D_{ij}$ are related by the constant $t^2/12$. Second, with a symmetric stacking sequence, a null coupling stiffness $B_{ij}$ can be deleted from the analysis. Thus the macromechanical behavior of an MFIL is identical to that of a homogeneous isotropic plate while the macromechanical behavior of an MQHAL is identical to that of a homogeneous anisotropic plate. Therefore, the classical theories and formulations for the homogeneous thin plates and curved shells are all applicable to the macromechanical analyses of the MFIL and MQHAL, which is a great simplification in laminate analysis.

Note that, to ease the technical discussion, the geometry of flat laminates has been used to describe the MFIL and the MQHAL layups. However, it is apparent that the application of MFIL and MQHAL are equally advantageous to both flat and curved laminates in every aspect described above.

4. ASYMMETRIC LAYUP

Throughout the above discussion of MFIL and MQHAL, the requirement of a symmetric layup with respect to the midplane is always emphasized to eliminate the coupling stiffness $B_{ij}$. However, there are circumstances that $B_{ij}=0$ can be achieved by using asymmetric layups.

Table 7 lists an asymmetric layup that uses different MQHAL layups in each half of the laminate and yields no coupling stiffness. The ply located immediately adjacent to the laminate midplane is designated as ply 1. The one next to ply 1 is ply 2, . . . , and so on. Positive ID's indicate plies above the midplane while negative ID's indicate plies below the midplane.

TABLE 7

A 26-ply Null-Coupling Asymmetric MQHAL of two nonisotropic materials

| Material Angle | Nonisotropic ($P_1$) $\theta$ | | | | | | | | Nonisotropic ($P_2$) $\phi$ | | | | |
|---|---|---|---|---|---|---|---|---|---|---|---|---|---|
| Ply ID | 1 | 2 | 3 | 4 | 9 | 10 | 11 | 13 | 5 | 6 | 7 | 8 | 12 |
|  | −1 | −2 | −3 | −5 | −7 | −10 | −12 | −13 | −4 | −6 | −8 | −9 | −11 |

In general, an asymmetric layup using MQHALs introduces a coupling stiffness although the identical stiffness anisotropy is preserved. Table 8 lists such an asymmetric layup.

Using Equation (15) and replacing $P_2$ with $P_1$, we can readily prove the full isotropy of such a laminate layup.

TABLE 8

A 26-ply Asymmetric Layup using MQHALs of two nonisotropic materials

| Material Angle | Nonisotropic ($P_1$) $\theta$ | | | | | | | | Nonisotropic ($P_2$) $\phi$ | | | | |
|---|---|---|---|---|---|---|---|---|---|---|---|---|---|
| Ply ID | 1 | 2 | 3 | 4 | 9 | 10 | 11 | 13 | 5 | 6 | 7 | 8 | 12 |
|  | −1 | −2 | −4 | −6 | −9 | −10 | −11 | −12 | −3 | −5 | −7 | −8 | −13 |

Similarly, an asymmetric layup using MFILs may introduce a coupling stiffness although the stiffness isotropy is preserved. In summary, when the coupling stiffness is desirable in addition to the characteristics of MFIL and MQHAL, asymmetric layups should be applied.

There are numerous ways to form asymmetric laminates using MFIL and MQHAL layups. A complete list is omitted due to page limitation.

5. FILs CONSTRUCTED WITH MFIL LAYUP

As previously described, the concept of MFIL is based on Equation (12) that is significantly improved over Equation (11) for the FIL concept. As a result, we discover that some MFIL layups can be modified to construct additional FIL layups that cannot be obtained by the method described in U.S. Pat. No. 5,312,670 by Wu and Avery.

For example, by replacing the ply material $P_2$ with $P_1$ in Table 4, we obtain Table 9 that lists the stacking sequence of a 50-ply symmetric FIL of a single nonisotropic material forming a total of seven material-orientations.

Due to the symmetry with respect to midplane, only the stacking sequence in half thickness of the laminate is listed. The ply Located immediately adjacent to the laminate midplane is designated as ply 1 in the table. The one next to ply 1 is ply 2, . . . , and so on. $\theta_1$ through $\theta_3$ indicate any three orientation angles equally spaced by $\pi/3$. $\phi_1$ through $\phi_4$ indicate any four orientation angles equally spaced by $\pi/4$.

However, this layup exemplifies a new category of FILs that cannot be obtained by the method described in the Wu-Avery patent:

1. The MFIL layup of the present invention enables this FIL, without forcing the same number of plies aligned in all (seven) orientation angles as specified in Claim 1-a of the Wu-Avery patent.
2. The MFIL layup of the present invention enables this FIL, without forcing all (seven) orientation angles to be equally spaced by $\pi/7$ as specified in Claim 1-b of the Wu-Avery patent.
3. The MFIL layup of the present invention enables this FIL, without forcing the sum of weighting factors in each orientation to be identical as specified in Claim 1-c-iii of the Wu-Avery patent.
4. The MFIL layup of the present invention enables this FIL, by using multiple (two) evenly-oriented sublaminates that are not FILs individually.
5. These multiple (two) evenly-oriented sublaminates can be rotated independent of each other and still combined to form an FIL.

In summary, the Wu-Avery patent envisioned the construction of an FIL by shuffling an EIL, while the MFIL layup of the present invention discovers the method of shuffling a laminate of multiple evenly-oriented sublami-

TABLE 9

A 50-ply FIL using MFIL layup that consists of two evenly-oriented sublaminates

| Material | Nonisotropic ($P_1$) | | | | | | |
|---|---|---|---|---|---|---|---|
| Angle | $\theta_1$ | $\theta_2$ | $\theta_3$ | $\phi_1$ | $\phi_2$ | $\phi_3$ | $\phi_4$ |
| Ply ID (k) | 1   9 | 3   13 | 7   16 | 2   5 | 4   12 | 6   11 | 8   10 |
|  | 24 | 22 | 19 | 15   25 | 14   23 | 17   21 | 18   20 |
| $3k^2 − 3k + 1$ | 1   217 | 19   469 | 127   721 | 7   61 | 37   397 | 91   331 | 169   271 |
|  | 1657 | 1387 | 1027 | 631   1801 | 547   1519 | 817   1261 | 919   1141 |
| Weighting factor for $A_{ij}$ (No. of plies) | 3 | 3 | 3 | 4 | 4 | 4 | 4 |
| Weighting factor for $D_{ij}$ ($\Sigma 3k^2 − 3k + 1$) | 1875 | 1875 | 1875 | 2500 | 2500 | 2500 | 2500 | nates, which successfully leads to a substantially new category of FILs.

Although there are numerous ways to construct the FILs using the MFIL layup, a complete list is omitted due to page limitation.

Having thus described the invention with particular reference to preferred embodiments, it will be obvious to those having ordinary skill in the art to which the invention pertains that numerous variations, changes, and approximations can be made without departing from the spirit and scope of the inventions as defined in the appended claims.

What is claimed is:

1. A multimaterial multi-ply laminate, which consists of at least four plies of at least two different materials, wherein the plies are bonded to each other wherein each material is either isotropic or nonisotropic, wherein each ply is of an identical uniform thickness, wherein on either side of the midplane of the laminate
   A. each nonisotropic material forms at least one evenly-oriented sublaminate, wherein each evenly-oriented sublaminate has at least three orientation angles, wherein each angle is equally spaced with one another, wherein each angle has the same total number of plies,
   B. each isotropic material forms at least one ply interleaving with plies of other isotropic or nonisotropic materials;
   C. the layup is defined by the following:
      (a) each ply is assigned a value, k, an integer starting from 1 and representing the stacking order of the ply from the midplane; each ply is also assigned a weighting factor equal to $3k^2-3k+1$;
      (b) in each evenly-oriented sublaminate of a nonisotropic material, the sums of weighting factors of all the plies aligned in each orientation are identical;
      (c) for a laminate consisting of only isotropic materials, the proportion of the sums of weighting factors of all the plies of each material equals to the proportion of the total numbers of plies of each material;
   wherein both sides of the laminate have the same isotropic and nonisotropic materials, the same total numbers of plies of each material, and the same sums of weighting factors of each material; wherein the resulting laminate has concomitant isotropy in extensional, shear, bending, and twisting stiffnesses.

2. The laminate of claim 1, wherein the proportion of the sums of weighting factors of all the plies of each material equals to the proportion of the total numbers of plies of each material; wherein the said bending stiffness equals to the said extensional stiffness multiplied by a constant, $t^2/12$, and the said twisting stiffness equals to the said shear stiffness multiplied by the same constant, $t^2/12$, wherein t is the thickness of the entire laminate.

3. The laminate of claim 1, wherein the said plies are of uniform thickness $\Delta t$, and a number, n, of adjacent plies of the same isotropic material or the same orientation of the same nonisotropic material can therefore be combined into one ply having a thickness of $n\Delta t$.

4. The laminate of claim 1, wherein the laminate is in the form of a planar plane.

5. The laminate of claim 1, wherein the laminate is in the form of a curved shell.

6. A multimaterial multi-ply laminate, which consists of at least four plies of at least two different materials, wherein the plies are bonded to each other wherein at least one material is nonisotropic, wherein each ply is of an identical uniform thickness, wherein the layup on either side of the midplane of the laminate is defined by the following:
   A. each ply is assigned a value, k, an integer starting from 1 and representing the stacking order of the ply from the midplane; each ply is also assigned a weighting factor equal to $3k^2-3k+1$;
   B. for each nonisotropic material, the proportion of the sums of weighting factors of all the plies in each orientation is equal to the proportion of the total numbers of plies aligned in each orientation;
   C. Amongst all the materials, the proportion of the sums of weighting factors of all the plies of each material equals to the proportion of the total numbers of plies of each material;
   wherein both sides of the laminate have the same isotropic and nonisotropic materials, the same total number of plies of each isotropic material, the same orientations of each nonisotropic material, and the same total numbers of plies aligned in each orientation of each nonisotropic material; wherein the resulting laminate has the same nonisotropy for bending and extensional stiffnesses, and the same nonisotropy for twisting and shear stiffnesses.

7. The laminate of claim 6, wherein the said bending stiffness equals to the said extensional stiffness multiplied by a constant, $t^2/12$, and the said twisting stiffness equals to the said shear stiffness multiplied by the same constant, $t^2/12$, wherein t is the thickness of the entire laminate.

8. The laminate of claim 6, wherein the said plies are of uniform thickness $\Delta t$, and the number, n, of adjacent plies of the same isotropic material or the same orientation of the same nonisotropic material can therefore be combined into one ply having a thickness of $n\Delta t$.

9. The laminate of claim 6, wherein the laminate is in the form of a planar plate.

10. The laminate of claim 6, wherein the laminate is in the form of a curved shell.

* * * * *